Jan. 10, 1928.
F. W. LORD
1,656,122
POULTRY FEEDER
Filed May 20, 1926
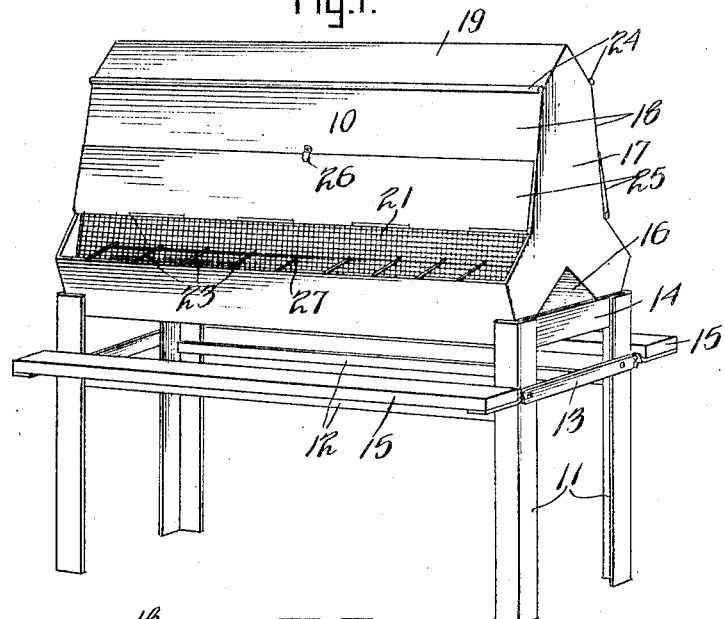
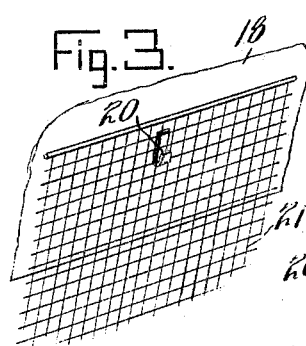
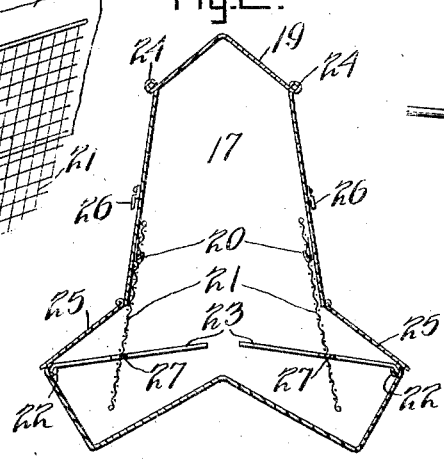
Inventor
Fred W. Lord
By
Attorney Patented Jan. 10, 1928.

1,656,122

UNITED STATES PATENT OFFICE.

FRED W. LORD, OF TIPTON, INDIANA, ASSIGNOR TO THE OAKES MANUFACTURING COMPANY, OF TIPTON, INDIANA, A CORPORATION OF INDIANA.

POULTRY FEEDER.

Application filed May 20, 1926. Serial No. 110,517.

My said invention relates to poultry feeders adapted for feeding mash to fowls and an object of the invention is to provide a time and labor saving device which is attractive in appearance of durable and sanitary construction and inexpensive to produce, all as will be hereinafter more fully described and claimed.

Referring to the accompanying drawings which are made a part hereof and on which similar reference characters indicate similar parts, Figure 1 is a perspective of my invention, Figure 2, a vertical section, Figure 3, a detail illustrating the method of supporting the grates, and Figure 4, the method of agitating the cross wires.

In the drawings reference character 10 indicates a feeder and 11 a stand for supporting the same. The stand may be of any prefered construction, however, I preferably employ legs held in proper spaced relation by means of longitudinal braces 12 and end braces 13 and 14. On the extremities of the braces 13 at one side of the frame I preferably mount a perch 15 mounted on the corresponding ends of the braces and capable of being folded against the side of the frame to prevent fowls from roosting thereon. This stand is of a construction similar to that which I have used with other types of feeders and does not form the essence of the present invention but may be modified as desired or may be dispensed with entirely and the feeder 10 allowed to rest on the floor.

The feeder 10 comprises a hopper for containing mash or other foodstuffs to be fed to poultry and receptacles for the mash as it is fed from the hopper. As shown I provide two troughs preferably V-shaped in cross section and said troughs are disposed in parallel relation and are united at their contiguous longitudinal edges to form a bottom 16 for the feeder. End sections 17 having upright bodies and diverging legs are provided and form closures for the ends of the troughs and for the hopper. The end sections 17 have their upper extremities inclined or tapering to an apex in order to form a support for a top 19 pivoted at one of its edges.

The top 19 has its edges rolled over as at 24 and such rolled over edges prevent injury to the hands or other parts of the body or to the clothing and also serve as troughs or gutters for draining water off the top of the feeder instead of permitting the same to run down into the feed troughs.

Side members 18 are provided and said side members extend from the point where the upper edges of the diverging legs join the bodies of the end members 17, to the inclined extremities of the said end members. This construction leaves an opening at the top through which foodstuffs, such as mash may be supplied and also a feed opening along the outer edge of each trough. Doors 25 are longitudinally pivoted at the bottom edge of each side 18 for covering the feed openings and a latch 26 is provided for holding these doors in elevated position.

The said side members 18 are provided with one or more hooks 20 on their inner surfaces and said hook or hooks are adapted to support wire screens 21 snugly against the inner surfaces of the sides. The screens 21 extend into the lower portions of the troughs, said screens 21 forming grates beneath the lower edges of which mash or the like contained in the feeder may be fed out and through which some of the mash may be picked by the fowls. Said grates 21 are vertically adjustable to vary the size of the outlet passages from the hoppers to the troughs. In order to prevent the rough edges of the trough from injuring the fowls said edges are rolled over, as indicated at 22, and said rolled-over edges are provided with perforations spaced longitudinally of the same and cross wires 23 are provided with their outer ends disposed within said perforations and with their inner ends extending through the screens or grates 21 into the hopper. The cross wires serve the double purpose of preventing the fowls from wasting the foodstuff as they stand on the perch 15 and feed from the trough at each side of the feeder and also for agitating the mash within the body or hopper of the device. One of the cross wires adjacent the center of the longitudinal feed opening is preferably bent as at 27 to assist in holding the screens or grates 21 in position. By providing the double trough construction with inclined bottom, mash or other foodstuff in the hopper will gravitate to the feed openings at the sides of the feeder where all of the mash may be accessible for consumption by the fowls.

It will be obvious to those skilled in the art that various modifications may be made in my device without departing from the spirit of the invention, as for example the cross wires 23 may be omitted as the flexible nature of the screens or grates vibrated by the fowls will agitate to a certain extent the mash or other contents of the hopper. However, I find that the cross wires are desirable as they extend into and agitate the contents of the hopper more thoroughly than can be done by the packing of the screens or grates. I therefore do not limit myself to what is shown in the drawings and described in the specification but only as indicated in the appended claims.

Having thus fully described my said invention, what I claim as new and desire to secure by Letters Patent is:

1. A feeder comprising a hopper, a trough formed at each side of and having communication with said hopper, a vertically adjustable grate of fine mesh extending down into said trough for constricting the outlet from the hopper but permitting the passage of foodstuff beneath the same, and cross wires detachably secured to the outer side of the trough and extending inwardly through said grate for agitating the contents of the hopper, substantially as set forth.

2. A feeder comprising a hopper, an inclined bottom for said feeder, a trough at one side of said inclined bottom and communicating with said hopper, a vertically adjustable grate of fine mesh extending down into said trough for constricting the outlet from the hopper but permitting the passage of foodstuff beneath the same, and cross wires detachably secured to the outer side of the trough and extending inwardly through said grate for agitating the contents of the hopper, substantially as set forth.

3. A poultry feeder comprising a pair of V-shaped troughs, a hopper above the intermediate portion of said troughs with a portion of each trough open at its outer edge, hooks on the inner side of said hopper, gratings of fine mesh suspended on said hooks for constricting the passage from said hopper to the troughs but permitting the passage of foodstuff beneath the same, said grates being adjustable to vary the size of the outlet passages from the hopper to the troughs, substantially as set forth.

4. A poultry feeder comprising a pair of V-shaped troughs, a hopper above said troughs with a portion of each trough open at each side of the hopper, hooks on the inner side of said hopper, gratings of fine mesh suspended on said hooks for constricting the passage from said hopper to the troughs but permitting the passage of foodstuff beneath the same, said grates being adjustable to vary the size of the outlet passages from the hopper to the troughs, and cross wires extending through said grates for agitating the contents of the hopper, substantially as set forth.

5. A poultry feeder comprising a base inclined from its center toward its outer edges, a bottomless hopper supported above said base, grates of fine mesh supported within the hopper in spaced relation to the base whereby the major portion of the foodstuff within the hopper may find its way out beneath said grates but also permitting a minor portion of the foodstuff to sift out through the grates, and cross wires detachably supported at the outer sides of said base and extending into the hopper for agitating the contents of the hopper, substantially as set forth.

6. A poultry feeder comprising a base inclined from its center toward its outer edges said base having its side edges rolled over and provided with longitudinally spaced perforations, a bottomless hopper supported above said base, a grate supported within the hopper in spaced relation to the base whereby foodstuff within the hopper may find its way out beneath and through said grate said grate being adjustable for varying the size of the opening from the hopper, and cross wires supported in the perforations in the side edges of said base and extending into the hopper for agitating the contents of the hopper, substantially as set forth.

7. A poultry feeder comprising a hopper, a trough beneath said hopper having a feed opening at one side of the same, a pivoted cover for said feed opening foldable snugly against the side of the hopper, a hook on the inner side of the hopper adjacent the open side of the trough, a grating of fine mesh adjustably supported on said hook for constricting the passage from the hopper to the trough and for varying the size of the outlet passages from the hopper beneath said grating, cross wires extending through the grate for agitating the contents of the hopper, and a cover for said hopper having its longitudinal edges curved upwardly to form drainage troughs, substantially as set forth.

8. A poultry feeder comprising a base having longitudinally spaced sockets at one side, a bottomless hopper supported above said base, a grate suspended at the side of the hopper in spaced relation to the base and crosswires supported in the sockets in said base and extending into the hopper for agitating the contents of the hopper, substantially as set forth.

In witness whereof, I have hereunto set my hand at Tipton, Indiana, this 13th day of May, A. D. nineteen hundred and twenty-six.

FRED W. LORD.